United States Patent

Rübelmann et al.

[11] Patent Number: 5,962,045
[45] Date of Patent: Oct. 5, 1999

[54] PROCESS FOR PRODUCING BEERS HAVING YEAST TURBIDITY

[75] Inventors: Klaus Rübelmann, Zolling; Martin Leibhard, Emmering; Maximilian Ammon, Spalt; Klaus Wojtenek, Fürth; Hans-Günther Rother; Jochen Sprotte, both of Nürnberg; Georg Rammelmeir, Lauterhofen, all of Germany

[73] Assignee: Tucher Braü AG, Nürnberg, Germany

[21] Appl. No.: 08/682,190

[22] Filed: Jul. 17, 1996

[30] Foreign Application Priority Data

Jul. 17, 1995 [DE] Germany ............... 195 26 005

[51] Int. Cl.6 ............... C12H 1/00; C12C 11/11
[52] U.S. Cl. ............... 426/8; 426/13; 426/16; 426/29; 426/60; 426/521
[58] Field of Search ............... 426/13, 11, 29, 426/16, 60, 521, 592, 8, 407, 412

[56] References Cited

U.S. PATENT DOCUMENTS

| | | | |
|---|---|---|---|
| 813,199 | 2/1906 | Clausen | 426/13 |
| 3,559,563 | 2/1971 | Brenner et al. | 99/275 |
| 4,790,993 | 12/1988 | Schedl et al. | 426/13 |
| 4,911,936 | 3/1990 | Kijima et al. | 426/62 |
| 4,954,354 | 9/1990 | Hopkins et al. | 426/8 |
| 5,298,264 | 3/1994 | Edens et al. | 426/8 |
| 5,705,211 | 1/1998 | Bedell et al. | 426/112 |

FOREIGN PATENT DOCUMENTS 3036771  2/1988  Japan.
5673  of 1891  United Kingdom.

OTHER PUBLICATIONS

Broderick et al, The Practical Brewer, Master Brewers Assoc. of the Americas, Wisconsin, 1977 pp. 165, 169 and 253–266.

Primary Examiner—Curtis E. Sherrer
Attorney, Agent, or Firm—Frishauf, Holtz, Goodman, Langer & Chick, P.C.

[57] ABSTRACT

A process is disclosed for producing beers having yeast turbidity, in particular wheat beer, in which it is possible to metabolize virtually completely the oxygen which has unavoidably passed into the container during packaging, and nevertheless to perform continuous pasteurization integrated into the filling device. For this purpose, prior to packaging, yeast and beer wort are again added to the beer, and the yeast in the beer present in a package is destroyed within 24 hours of packaging. By this means, sterile beer having very high flavor stability can be produced, which is also suitable for sale of canned beer and for export even to distant countries.

22 Claims, 3 Drawing Sheets

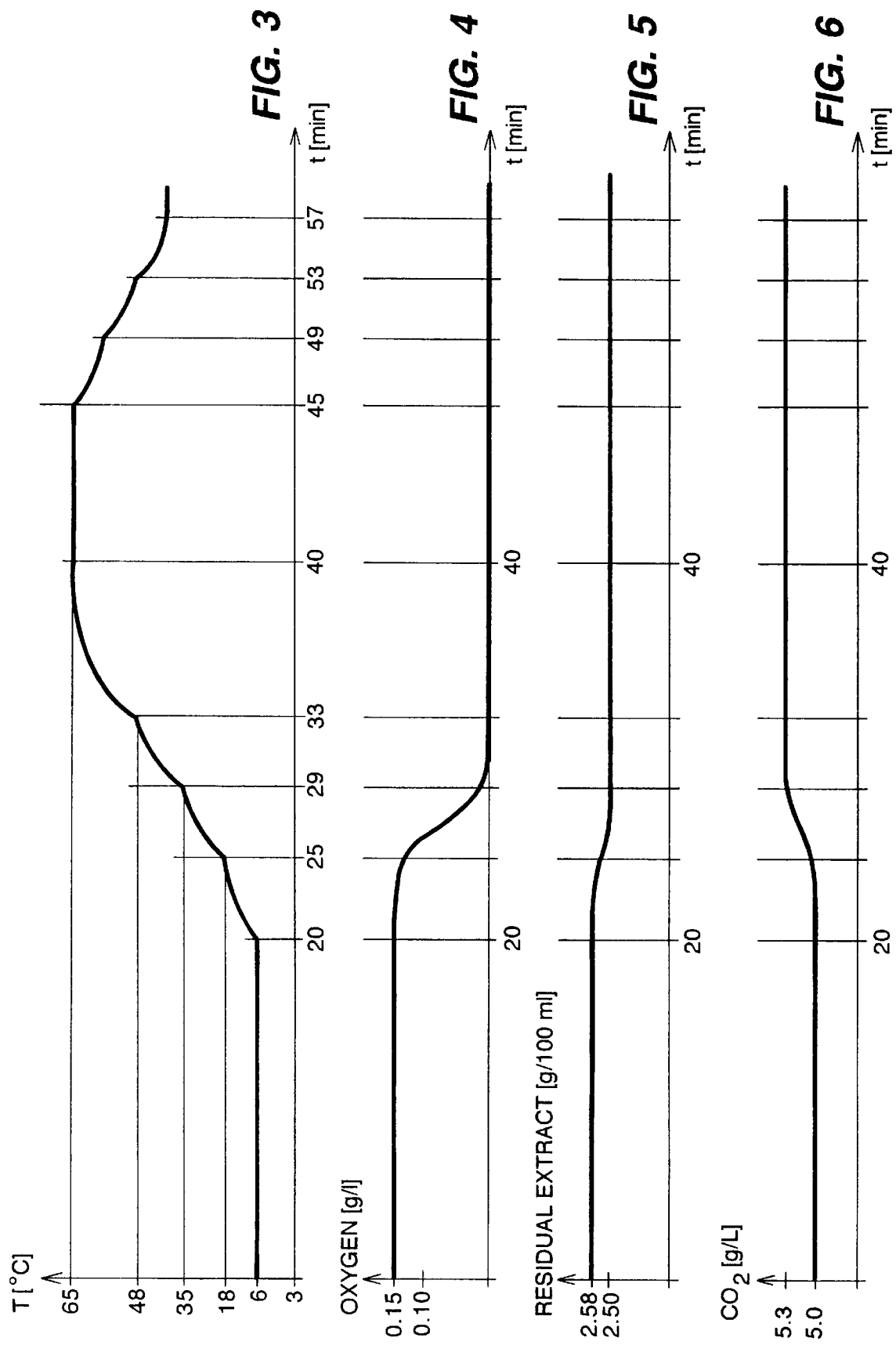

PROCESS FOR PRODUCING BEERS HAVING YEAST TURBIDITY

BACKGROUND OF THE INVENTION

The invention relates to a process for producing beers having yeast turbidity, in particular wheat beer, in which hopped beer wort is fermented by addition of yeast, after which the beer thus produced is packaged into suitable containers. Processes of this type have long been known for brewing white beer or wheat beer, Krausen beer and other beers having yeast turbidity and are very widely used. Since the previously prevailing close physical proximity of the breweries to their surrounding area due to the available storage and transport possibilities has been to a great extent abolished, beers of such types are now also stored for relatively long periods and some are even exported to distant foreign countries under severe climatic conditions.

The requirements thus newly created of keeping quality and sterility of the beers require corresponding measures, some of which conflict with the requirements regarding flavor stability.

The atmospheric oxygen conjointly introduced into the container during filling is a considerable problem. The beer present in the container reacts with this oxygen in the course of time, which leads to a decrease in flavor quality. In bottling, there has therefore been a changeover to evacuating the bottles, then flushing them with carbon dioxide, pressurizing them with carbon dioxide and then bottling the beer. The bottles are finally sealed gas-tightly with a crown cork. However, even in this process, a certain amount of atmospheric oxygen still enters the bottle during the bottling operation.

During canning of the beer, this problem becomes of still greater importance. Since the can, because of its inadequate pressure resistance, cannot be optimally evacuated during filling, and, in addition to this, offers a greater surface area, considerably more oxygen passes into the can than during bottling.

In brewing technology, in addition, the bottle fermentation process is widespread. In particular in the case of wheat beers, prior to packaging, the beer, which may have been heat-treated for a short time, is admixed with further beer wort and yeast. The added residual extract is then fermented in the bottle, as a result of which the oxygen in the container is consumed. However, in this secondary fermentation, which generally takes place over weeks, fermentation byproducts are also formed and the exhausted yeast remains in the beer, which can lead to a reduction in flavor quality.

For sale of beer to distant countries, it is moreover important that, after packaging, thermal destruction of microorganisms, e.g. by pasteurization, is performed in the packages, in order to ensure sterility and to prevent product damage, such as flavor impairment, by the action of beer-spoilage microorganisms. However, this approach has the considerable disadvantage that the yeast introduced for the purpose of secondary fermentation can no longer develop its activity and thus the oxygen in the container is no longer metabolized. In addition, the tendency of the oxygen to react with the beer present in the container is activated, or enlivened, at higher temperatures and, thus, by the temperature increase in the pasteurization, which leads to an accelerated "aging process" of the beer. Owing to the interaction with the oxygen, the flavor quality of the beer therefore deteriorates with time, which is further reinforced by temperature effects and movements.

Although the addition of active compounds, such as ascorbic acid or vitamin C, which is sometimes practiced in the case of other beverages can restrict these problems, in some countries it is not used for beer in view of a purity law, such as in Germany.

SUMMARY OF THE INVENTION

It is, therefore, an object of the invention to provide a process for producing beers having yeast turbidity, in which the most extensive reduction of the oxygen in the container becomes possible and, despite this, thermal destruction of microorganisms in the container can be carried out.

This object is achieved by adding further yeast and beer wort to the beer prior to packaging, and destroying the yeast (i.e. the yeast cells cease growing and die off completely) present in a package, in particular by pasteurization, within 24 hours of packaging.

As has surprisingly been found, the relatively short time between packaging and the thermal destruction of the yeast is sufficient for the oxygen present in the container to be able to be metabolized after a defined addition of yeast and beer wort. By this means, the risk of flavor impairment due to the interaction of the oxygen with the beer can be averted.

In addition, the added yeast is present in the product in a stable state after the pasteurization and, thus, does not adversely affect the flavor quality of the beer. Furthermore, the yeast growth process can be terminated in good time, before fermentation begins intensively and byproducts are formed to a greater extent. These, together with the exhausted yeast, would lead to an impairment of flavor, as occurs in the case of bottled fermentation after a certain time.

In addition, the requirements with regard to sterility of this foodstuff can be complied with even in the case of export to distant countries. The risk occurring in this case of flavor impairment and even of bursting of the container owing to contamination with beer-spoilage microorganisms can be avoided by the pasteurization.

The German beer purity law is likewise taken into account by this process.

Owing to this targeted metabolism of the oxygen in the container, in addition, the process step of evacuating the containers prior to filling is no longer absolutely necessary. Furthermore, preliminary flushing and pressurization of the containers with carbon dioxide is also not necessary. The short-time heating carried out in conventional processes prior to filling can also thus be omitted.

Furthermore, the stepwise heating of the beer performed in the thermal destruction can be utilized so that the yeast can develop its optimal activity which it has in a temperature range between 16° and 25° C. The heating necessary for destruction can thus be utilized in addition for controlling the oxygen metabolism during the growth of the yeast. Thus, a beer with stable flavor can be produced in which all microorganisms have been killed by the final thermal destruction.

It is a further advantage if the destruction is performed within a relatively short period, such as within 6 hours, preferably within 3 hours, and most preferably within one hour of packaging. This can considerably decrease the time and space requirements for intermediate storage.

By performing the destruction by means of a continuous pasteurizer integrated into the filling line, the process sequence can be considerably accelerated and, in addition, fully automated.

This makes it possible to perform the destruction within half an hour after filling, which provides the further advantage that intermediate storage or delay loops and buffer sections of the feed belts can be mostly avoided. The time required for the course of the process can thus be kept optimally low.

By adding the beer wort in a slightly prefermented state, the yeast multiplication can be very rapidly initiated, which enables rapid metabolism of the oxygen.

It is a further advantage if the yeast is added as assimilated yeast. Assimilated yeast is yeast which is constituted to react with the available oxygen and can metabolize (i.e. consume) this oxygen very rapidly.

The fact that the added yeast is in the logarithmic phase means that it develops its optimum activity and can metabolize the oxygen very rapidly.

Addition of a yeast/wort mixture of less than 3% by volume, preferably less than 2% by volume, and in particular less than 1% by volume, enables the oxygen metabolism to be controlled as exactly as possible. The yeast contents remain in the beer after the pasteurization and the amount of byproducts produced is kept to a minimum, and the flavor change resulting therefrom remains extremely small. The residues thus remaining in the beer due to the secondary fermentation of the invention therefore do not impair the beer quality.

If the added yeast/wort mixture is taken from a continuous yeast culture, this offers further advantages with regard to the constant availability of a mixture of uniform high quality. The process can, in addition, be readily automated.

BRIEF DESCRIPTION OF THE DRAWINGS

The invention is described in more detail below in illustrative examples based on the figures of the drawing. In the figures:

FIG. 3 shows the temperature course between the filling device and the pasteurizer;

FIG. 4 shows the course of the oxygen content in the container corresponding to FIG. 3;

FIG. 5 shows the course of the residual extract content in the container corresponding to FIG. 3; and FIG. 6 shows the course of the carbon dioxide content corresponding to FIG. 3.

DESCRIPTION OF THE PREFERRED EMBODIMENT(S)

Figure 1:
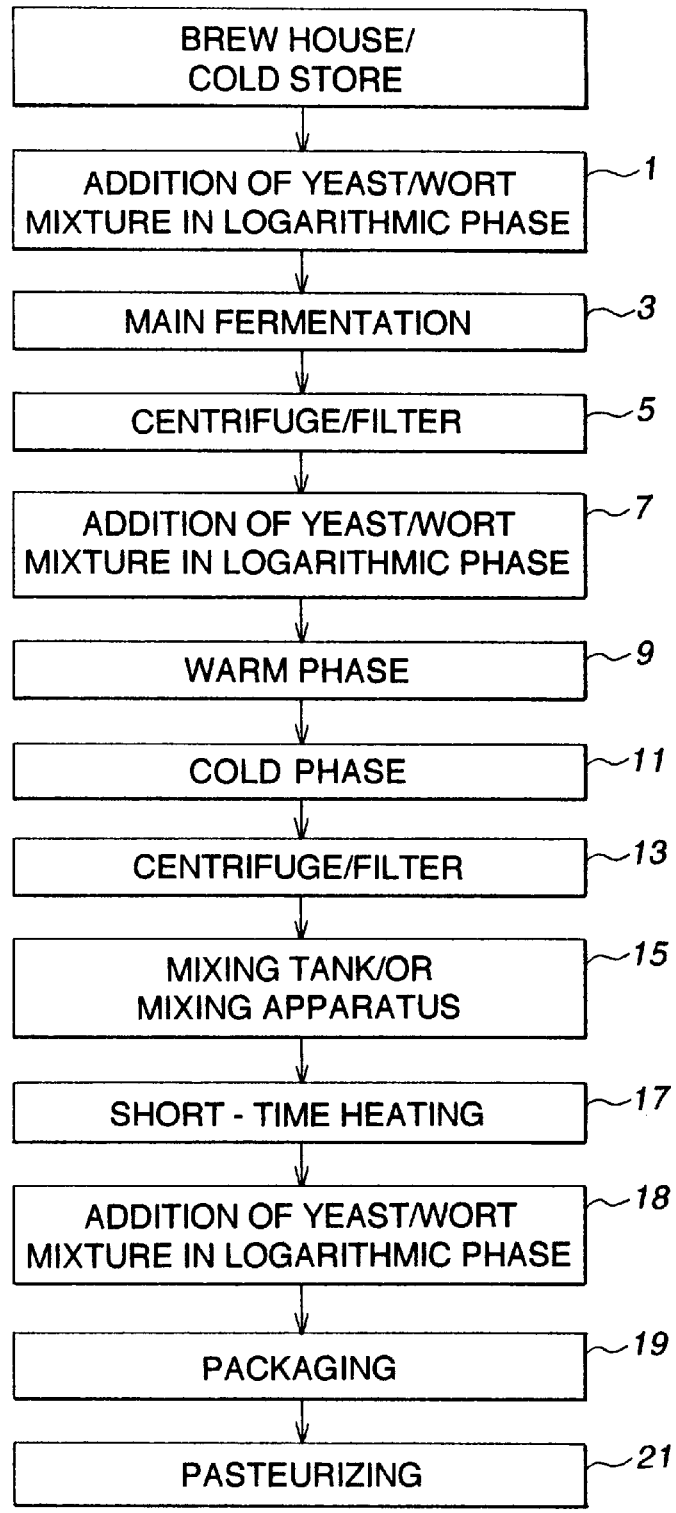
FIG. 1 shows a flow diagram of a process of the invention for producing beers having yeast turbidity.

According to the depiction in FIG. 1, in a process for producing beers having yeast turbidity, a yeast/wort mixture in the logarithmic phase is added to a hopped beer wort from the brew house or cold storage.

Figure 2:
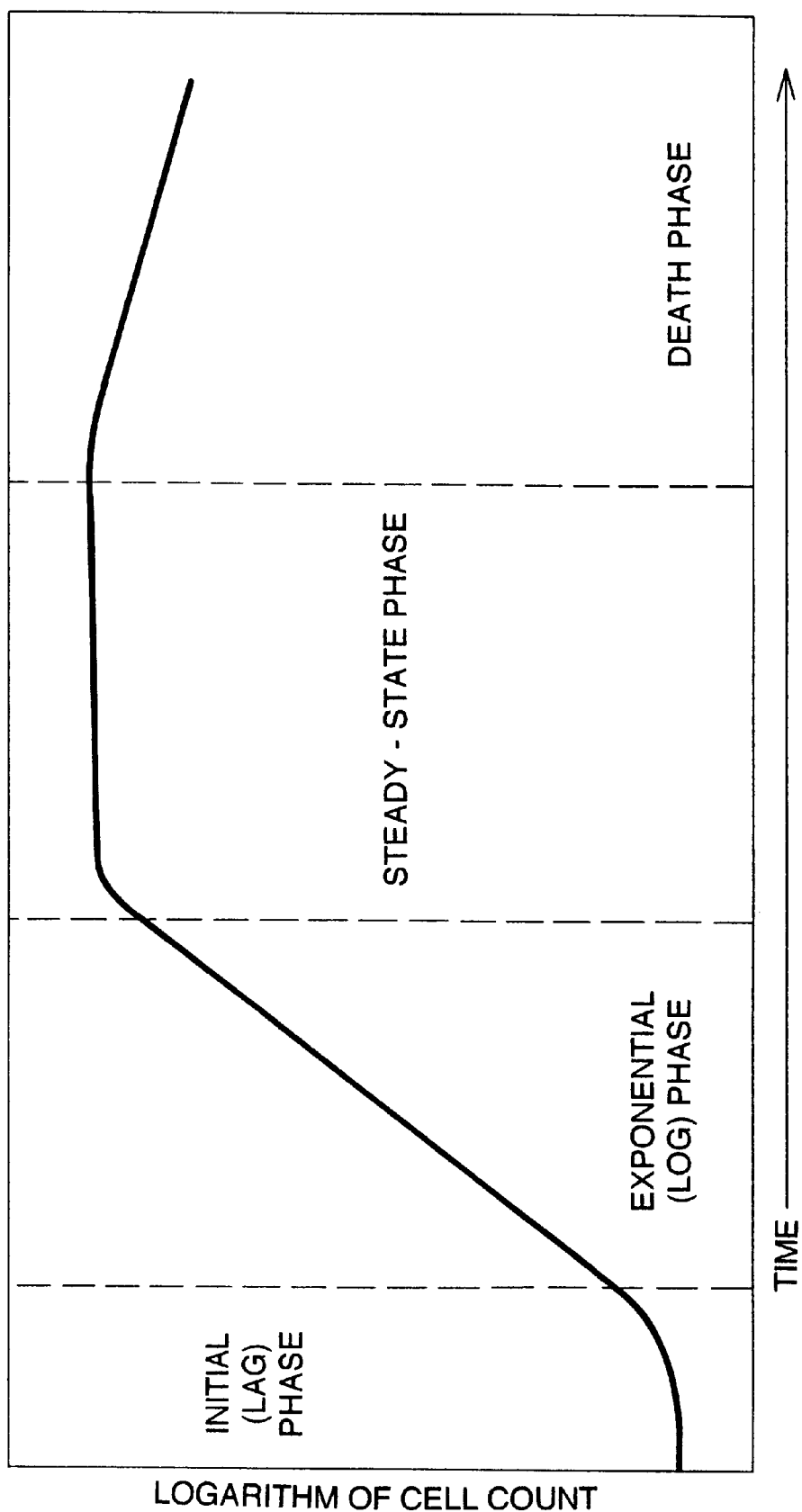
FIG. 2 shows the growth curve of yeast cells.

The importance of the so-called "exponential" or "logarithmic" phase can be indicated with reference to FIG. 2. FIG. 2 shows, with reference to a batch culture, the number of yeast cells in the beer wort as a function of time. The starting point here is an original gravity of 12.5%, in which the beer wort is present in an unfermented state. The yeast is introduced as so-called "pure culture yeast" and the number of yeast cells initially increases slowly in the initial phase, and subsequently with very high growth rates having an almost linear course in this method of plotting. This range is termed the "exponential" or "logarithmic" phase. It is characterized by a constant maximum rate of yeast cell division.

The steady-state phase then occurs, in which the growth curve increasingly flattens. Up to this region, the "aerobic phase" of the yeast is present, in which multiplication of the yeast cells with consumption of oxygen occurs.

The fermentation essentially starts only when the available oxygen has been consumed for the growth purposes of the yeast cells and represents a type of "emergency metabolism" of the yeast. The yeast cells therefore prefer an aerobic environment, generating many times the energy than is the case in the absence of oxygen. The yeast cells use this energy for the exponential growth. The fermentation finally takes place under anaerobic conditions and by this means the essential alcohol component and fermentation byproducts, such as higher alcohols, esters etc., are formed.

After the steady-state phase of the growth curve according to FIG. 2, a type of "self-poisoning" of the yeast occurs owing to metabolites from the fermentation then starting. This region is termed the death phase. The number of active yeast cells subsequently decreases and the period for further fermentation increases visibly.

The region of approximately linear increase, the "logarithmic phase", characterizes the region of yeast cell division which the yeast/wort mixture added to the beer has reached, so that a flavor-stable beer can be achieved. The yeast cells are growing most vigorously here and can, therefore, consume a large amount of oxygen.

After the yeast/substrate mixture of yeast/wort mixture has been added to the hopped beer wort (Step 1), the main fermentation according to FIG. 1 takes place (Step 3). Here, the malt starch, which has been converted into sugar, is subjected to fermentation, with formation of alcohol, carbon dioxide and byproducts. In the case of bottom-fermented beers, a temperature range between approximately 4° C. and 10° C. is maintained here, and in the case of top-fermented beers, between approximately 10° C. and approximately 30° C. In practice, these limits are also sometimes departed from.

The exhausted yeast is then removed by centrifuging/filtering (Step 5), and then exchanged for fresh yeast with high fermentation power (Step 7). By this means, diacetyl breakdown can occur in the so-called warm phase. The warm phase is conducted at approximately 20° C. to 25° C. (Step 9). Diacetyl is a fermentation byproduct that occurs during the warm phase, which is undesirable for flavor reasons.

At a temperature of generally −2° C. to 8° C., in the subsequent so-called cold phase (Step 11), stabilization and maturing of the beer take place. By means of the subsequent centrifuge/filter operation (Step 13) and the mixing tank or mixing apparatus operation (Step 15), a defined yeast cell count and turbidity of the beer are controllably set. The desired yeast cell count and turbidity for a specific case depend on the kind of beer, details of which are well known to one with ordinary skill in the art.

Short-time heating is then performed (Step 17), which destroys any beer-spoilage microorganisms present and destroys the yeast to stabilize the microbiological keeping quality. The duration of this step depends on the kind of beer, and such details are well known to one with ordinary skill in the art. This short-time heating step could be omitted in the event of subsequent pasteurization.

On the other hand, the short-time heating step is used to achieve a clearly defined "secondary fermentation" with the addition of a yeast/wort mixture in the logarithmic phase (Step 18). An exact dosage of this mixture ensures targeted reduction of the oxygen content of the beer and, thus, an increased capability to stabilize quality with respect to flavor. An example of the exact dosage for a particular beer is set forth below under the heading "Example: Canning". This dosage depends on the kind of beer, and such details are well known to one with ordinary skill in the art.

In order that the added yeast/wort mixture for the secondary fermentation can develop its complete activity in the container, e.g. the can, as desired, it is not added until just before filling.

In the filling operation, the beer is packaged into containers (Step 19), in this example, into cans. The containers are then transported onto a continuous pasteurizer in which thermal destruction of microorganisms takes place (Step 21). This pasteurization is performed principally in the case of canned beer and export beer.

The yeast/wort mixture added prior to filling reacts with the oxygen which is still present in the container during the short interval between the filling device and the pasteurizer. Since the yeast is in the logarithmic phase, it takes up a large amount of oxygen and uses this for yeast cell multiplication.

The temperature course followed in Steps 19 and 21 is shown in FIG. 3. Starting from a filling temperature of approximately 3° C., there is only a minor increase to approximately 6° C., because of the room temperature, in a period of up to approximately 20 minutes. The containers then pass into the pasteurizer and are then heated stepwise by hot water flowing over the containers. The temperature here is initially increased to approximately 18° C. In this temperature range, the yeast cells can develop their optimal activity and consume oxygen to an increased extent.

In the course of a further temperature increase in the pasteurizer to approximately 35°, the yeast cell growth continues further and the amount of oxygen in the container decreases to an increasing extent. During this, the temperature passes through the optimum growth temperature of 28° C.

From a temperature level of approximately 40° C. in the course of a further heating in the pasteurizer to approximately 48° C., the yeast cells cease growing and die off completely at the final temperature of approximately 65° C. in the pasteurizer. The temperature for the thermal destruction in the pasteurizer is achieved in this example in a time period of approximately 20 minutes.

Because of the favorable conditions during the heating phase in the pasteurizer and the precisely metered amount of the yeast/wort mixture, the oxygen in the container can thus be metabolized virtually completely in accordance with the graph in FIG. 4.

Since the added yeast cells are essentially destroyed by the pasteurization before they have reached the steady-state phase of their growth curve (cf. FIG. 2), virtually no fermentation occurs and the formation of undesired byproducts can thus largely be prevented.

The pasteurization kills the yeast when it is still in the growth phase, and it is thus present in the beer in stable form. Impairment of flavor quality due to exhausted, fermented yeast, its decomposition products and any byproducts of fermentation can thus be prevented.

After the pasteurization, the temperature is decreased again stepwise, in accordance with FIG. 3.

As can be seen in FIG. 5, the content of residual extract decreases during this process from approximately 2.58 g/100 ml to approximately 2.50 g/100 ml. The extract is the wort used to react with the yeast. Because of the reaction of the yeast with the oxygen before and during pasteurization, the extract will be consumed since it is necessary to enable this reaction. The residual extract is the wort which has not been consumed. Thus, it decreases during the reaction of the yeast with the oxygen. According to FIG. 6, the content of carbon dioxide formed during the fermentation simultaneously increases only slightly from approximately 5.0 g/l to approximately 5.3 g/l.

The carbon dioxide content in the container is a problem, in particular in the case of cans, since, under unfavorable conditions, excessive levels can lead to buckling and, in extreme circumstances, to bursting of the cans in the pasteurizer.

As can be further seen in the diagrams of FIGS. 3 to 6, the maximum temperature in the pasteurizer of approximately 65° C. is achieved about 40 minutes after filling. However, it can be seen from FIG. 4 that the oxygen content is already completely metabolized after approximately half an hour, after the temperature has passed through the range optimum for the yeast cell growth.

The invention is clarified below on the basis of a numerical example for canning wheat beer.

EXAMPLE

Canning (Original Wort Gravity 12.5%)

| Beer to be canned | |
|---|---|
| $CO_2$, content: | 5.0 g/l |
| Yeast cell count: | 1.0 million cells per ml |
| Residual extract: | 2.5 g/100 ml |
| Addition Yeast/wort mixture | |
| Yeast cell count: | 90 million cells per ml |
| Residual extract: | 10.0 g/100 ml |
| After addition of 1% by volume of yeast/wort mixture | |
| Yeast cell count: | approximately 1.9 million cells per ml |
| Residual extract: | approximately 2.58 g/100 ml |

The amount of oxygen which causes the above-discussed disadvantages during the course of production can be demonstrated with reference to the behavior of some components of aging. Conclusions can be drawn therefrom on the flavor stability of the beer. Typical indicators of this are 3-methylbutanal and 2-phenylethanal, the sum of these indicators being used as a measure of flavor stability in the following example.

Example

Oxygen Indicators

| | Sum of oxygen indicators | Flavor |
|---|---|---|
| Upstream of pasteurizer: | | |
| 0 Beer | 10 μg/l | clean |
| V Beer | 10 μg/l | clean |
| After pasteurizer and ageing: | | |
| 0 Beer | 70 μg/l | markedly oxidized, bready |
| V Beer | 35 μg/l | clean |

In these results:
0 Beer: indicates beer without addition of yeast/wort mixture
V Beer: denotes beer with addition of yeast/wort mixture prior to packaging.

In this example, the markedly lower content of aging components when the yeast/wort mixture is added prior to packaging can be seen. The flavor stability of beer is, therefore, considerably improved.

The invention, in addition to the illustrative examples shown here, permits a number of further design approaches for the process for producing beers having yeast turbidity.

The yeast/wort mixture can also be taken, for example, from a continuous yeast culture, details of which are well known to one with ordinary skill in the art. The gist of the continuous yeast culture is to transfer the yeast cells repeatedly into a new, fresh wort substrate. In order to do so, a new nutrient solution or wort, for example, may be supplied continuously to the yeast population, and the consumed or exhausted suspension, which is the product of the wort after the growing of the yeast cells, will be removed in essentially the same amount. Thus, within such a culture there is at any time fresh nutrient solution or wort and less consumed suspension. How to add and remove these components is well known in the art.

Whereas, in the batch culture, the culture conditions are constantly changing, since the yeast density is increasing and the substrate concentration is decreasing, the conditions in a continuous culture are kept in a desired range. In this type of culture, the desired range, generally the logarithmic phase, is permanently maintained by repeated transfer of the yeast cells into a new fresh wort substrate. The new nutrient solution or wort can also be supplied continuously to the yeast population and exhaust suspension removed accordingly. The conditions in the yeast culture thus remain approximately constant and a yeast/wort mixture of constant quality can be achieved. At the same time, the growth of the yeast cells, and thus the oxygen consumption also, can be kept in the optimum range. The process sequence can, therefore, be further automated.

In practice, the time period for moving the container between the filling device and the pasteurizer can also be considerably shorter than 20 minutes. Depending on the arrangement and structure of the feeding lines from the filling device to the pasteurizer, the filled container can be conveyed to the pasteurizer, for example, even in the course of 3 minutes.

The process, in addition, is not restricted to canning, but can also be applied to bottles, kegs and even standard containers.

The short-time heating (Step 17) shown prior to the packaging (Step 19) can also be omitted completely. However, this may mean that the subsequent secondary fermentation prior to the pasteurization (Step 21) is not carried out with sufficiently high precision.

Instead of the centrifuges used in Step 13 downstream of the main fermentation of the cold phase in Step 11, filters or other suitable separation systems could also be used.

If no yeast/wort mixture in the logarithmic phase is available, a greater time interval would be necessary for the secondary fermentation to take place, which could be achieved by delay loops or delay belts between the filling device and the pasteurizer.

The invention thus provides a process for producing beers having yeast turbidity, in particular wheat beer, in which it is possible to metabolize virtually completely the oxygen which has unavoidably passed into the container during packaging, and nevertheless to perform pasteurization by a continuous pasteurizer integrated into the filling device. By this means, sterile beer having very high flavor stability can be produced, which is also suitable for sale of canned beer and for export even to distant countries.

What is claimed is:

1. A process for producing beers having yeast turbidity, comprising the following sequence of steps:

fermenting hopped beer wort by addition of yeast to produce beer, adding further yeast and beer wort to the beer, packaging the beer into a suitable container so that said further yeast has a level of activity which can virtually completely metabolize oxygen in an unfilled portion of said container, and destroying the further yeast present in said container within 24 hours of said packaging.

2. The process as claimed in claim 1, wherein the destroying step is performed within 6 hours of said packaging.

3. The process as claimed in claim 1, wherein the destroying step is performed by a continuous pasteurizer integrated into a filling line which performs said packaging step.

4. The process as claimed in claim 2, wherein the destroying step is performed by a continuous pasteurizer integrated into a filling line which performs said packaging step.

5. The process as claimed in claim 1, wherein the destroying step is performed within half an hour of said packaging.

6. The process as claimed in claim 1, wherein the further beer wort is added by said adding step in a slightly prefermented state.

7. The process as claimed in claim 1, wherein the further yeast is added by said adding step as assimilated yeast.

8. The process as claimed in claim 7, wherein the further yeast added in said adding step is in a logarithmic phase.

9. The process as claimed in claim 1, wherein the further yeast and beer wort add less than 3% by volume to said beer as processed up to said adding step.

10. The process as claimed in claim 1, wherein the further yeast and beer wort added in said adding step are taken from a continuous yeast culture.

11. The process as claimed in claim 1, wherein said destroying step comprises pasteurization.

12. The process as claimed in claim 1, wherein the destroying step is performed within 3 hours of said packaging.

13. The process as claimed in claim 1, wherein the destroying step is performed within 1 hour of said packaging.

14. The process as claimed in claim 1, wherein the further yeast and beer wort added in said adding step add less than 2% by volume to said beer as processed up to said adding step.

15. The process as claimed in claim 1, wherein the further yeast and beer wort added in said adding step add less than 1% by volume to said beer as processed up to said adding step.

16. A process for producing beers having yeast turbidity, comprising the steps of:

fermenting hopped beer wort by addition of yeast to produce beer, packaging the beer into a suitable container, adding further yeast and beer wort to the beer prior to said packaging step such that said further yeast substantially completely metabolizes oxygen in a portion of said container not filled with said beer, and destroying said further yeast in said container so that virtually no fermentation occurs in said container and after said oxygen has been metabolized virtually completely.

17. The process of claim 16, wherein said destroying step is performed within 6 hours of said packaging step.

18. The process of claim 17, wherein said destroying step is performed within half an hour of said packaging step.

19. The process of claim 16, wherein said destroying step comprises pasteurization.

20. The process of claim 16, wherein said further yeast is in a logarithmic state when added to said beer by said adding step.

21. The process of claim 20, wherein said destroying step destroys said further yeast before it reaches a steady state.

22. The process of claim 20, wherein said packaging step occurs shortly after said adding step.

* * * * *